(12) United States Patent
Levavasseur et al.

(10) Patent No.: US 11,761,795 B2
(45) Date of Patent: Sep. 19, 2023

(54) DEVICE FOR MEASURING AN ANGULAR POSITION OF A MOVABLE BODY RELATIVE TO A STATIONARY BODY

(71) Applicants: SAFRAN LANDING SYSTEMS, Velizy Villacoublay (FR); SAFRAN ELECTRONICS & DEFENSE, Paris (FR)

(72) Inventors: Didier Levavasseur, Moissy-Cramayel (FR); Thierry Bickard, Moissy-Cramayel (FR)

(73) Assignees: SAFRAN LANDING SYSTEMS, Velizy-Villacoublay (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/641,261

(22) PCT Filed: Sep. 3, 2020

(86) PCT No.: PCT/EP2020/074553
§ 371 (c)(1),
(2) Date: Mar. 8, 2022

(87) PCT Pub. No.: WO2021/047985
PCT Pub. Date: Mar. 18, 2021

(65) Prior Publication Data
US 2022/0333955 A1 Oct. 20, 2022

(30) Foreign Application Priority Data
Sep. 9, 2019 (FR) ........................................ 1909912

(51) Int. Cl.
*G01D 5/20* (2006.01)
*G01P 3/488* (2006.01)

(52) U.S. Cl.
CPC ........... *G01D 5/2073* (2013.01); *G01P 3/488* (2013.01)

(58) Field of Classification Search
CPC ............................. G01D 5/2073; G01P 3/488
See application file for complete search history.

(56) References Cited

U.S. PATENT DOCUMENTS 5,239,288 A * 8/1993 Tsals .................... G01D 5/2086
336/200
5,394,760 A * 3/1995 Persson .................. G01L 3/105
73/862.331
(Continued)

FOREIGN PATENT DOCUMENTS

DE   102016202867 B3   4/2017
DE   102016202859 B3   6/2017
(Continued)

*Primary Examiner* — Walter L Lindsay, Jr.
*Assistant Examiner* — Milton Gonzalez
(74) *Attorney, Agent, or Firm* — Muncy, Geissler, Olds & Lowe, P.C.

(57) ABSTRACT

A measurement device for measuring an angular position of a movable body that is rotatable about an axis of rotation relative to a stationary body, the device comprising, facing each other, a movable portion with a first printed circuit having first tracks formed thereon defining a plurality of target patterns and a stationary portion with a second printed circuit having second tracks formed thereon defining a plurality of measurement patterns that are angularly distributed in regular manner. The target patterns are angularly distributed in irregular manner, the number of target patterns is not less than two, and the product of the number of target patterns multiplied by the number of measurement patterns is not less than twelve.

13 Claims, 5 Drawing Sheets

(56) References Cited

U.S. PATENT DOCUMENTS

| | | | | |
|---|---|---|---|---|
| 6,628,038 B1 * | 9/2003 | Shikayama | ......... | G01D 5/2086 310/DIG. 6 |
| 7,394,242 B2 * | 7/2008 | Pradier | ................. | B64C 25/36 324/207.2 |

FOREIGN PATENT DOCUMENTS

| | | |
|---|---|---|
| DE | 102016202871 B3 | 6/2017 |
| DE | 102016202877 B3 | 6/2017 |
| JP | 08136211 A * | 5/1996 |
| WO | WO-2018/086920 A1 | 5/2018 |

\* cited by examiner

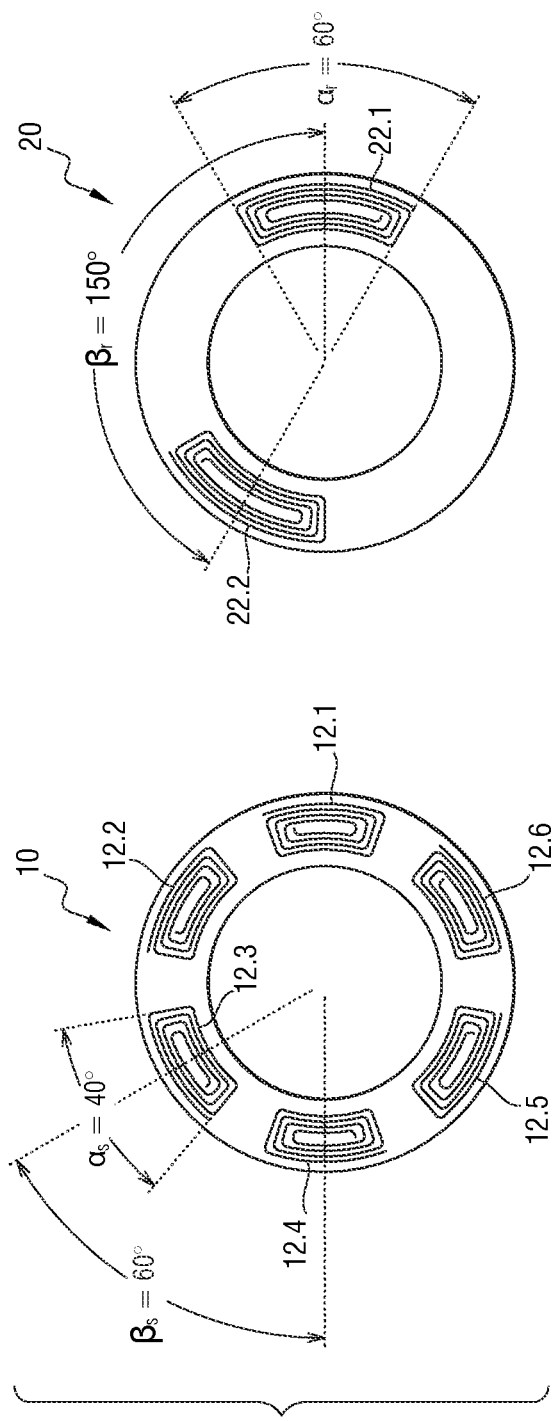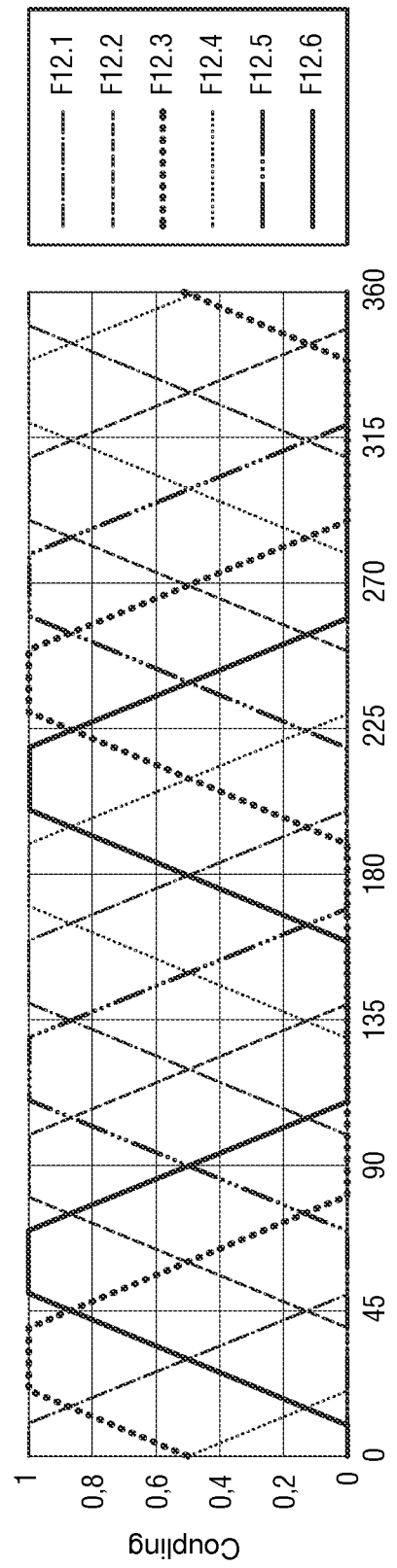
Fig. 3a
Fig. 3b

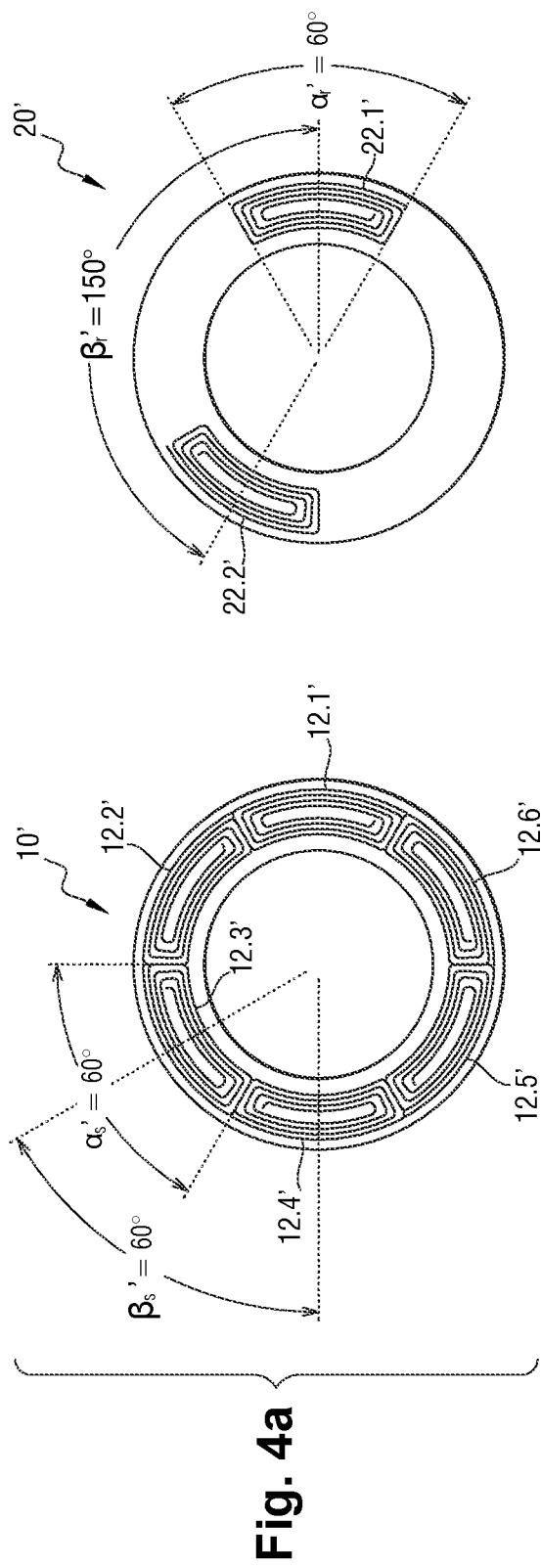
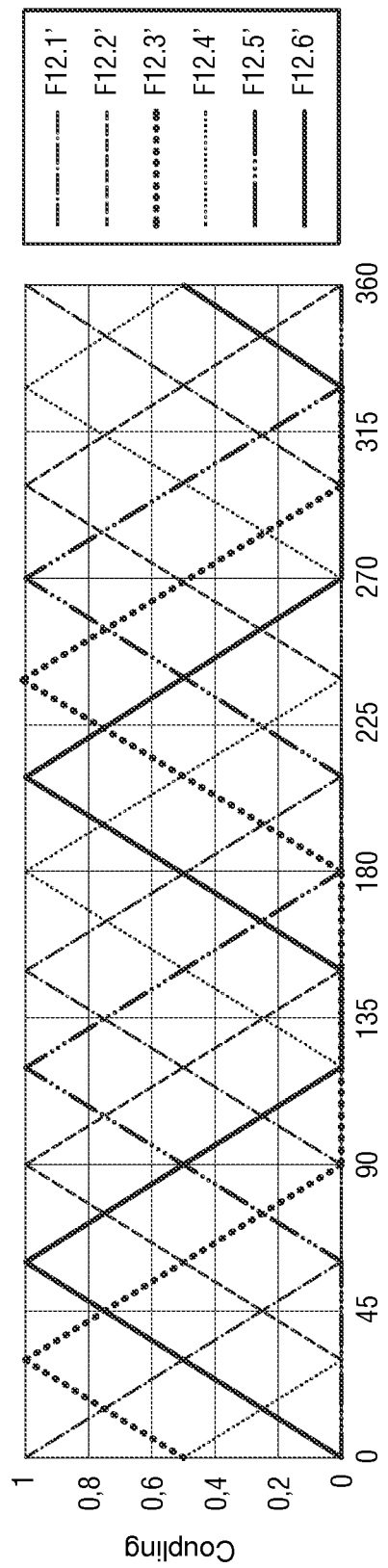
Fig. 4a
Fig. 4b

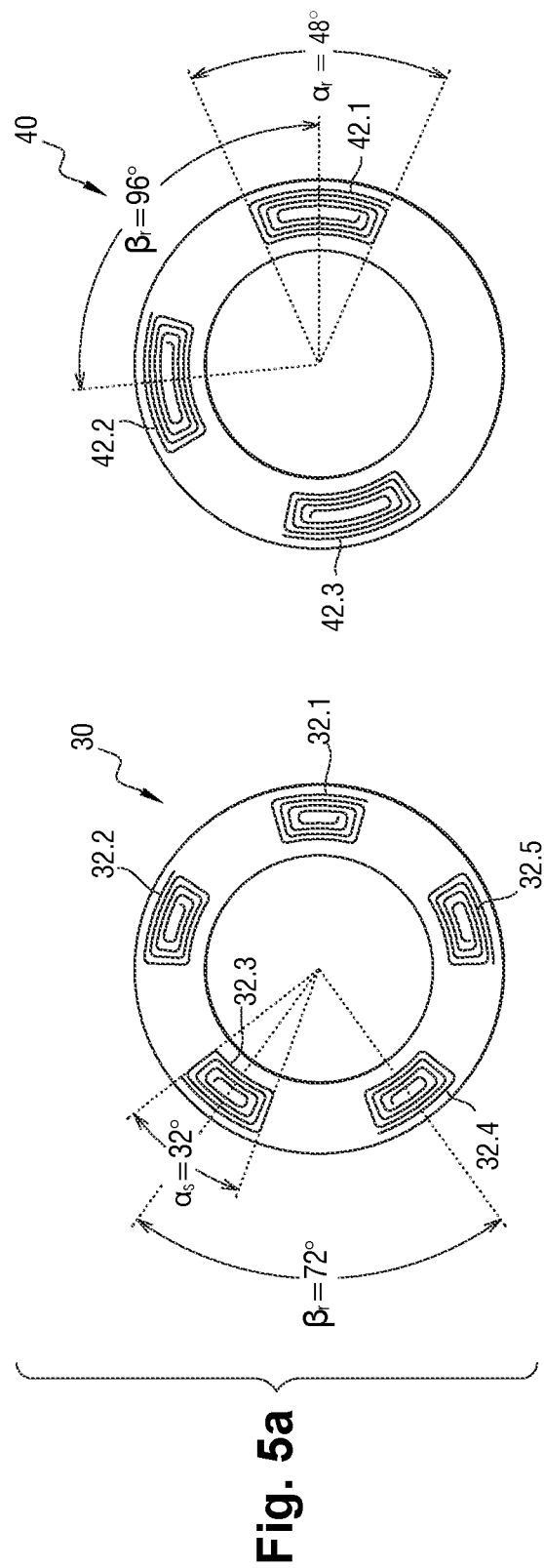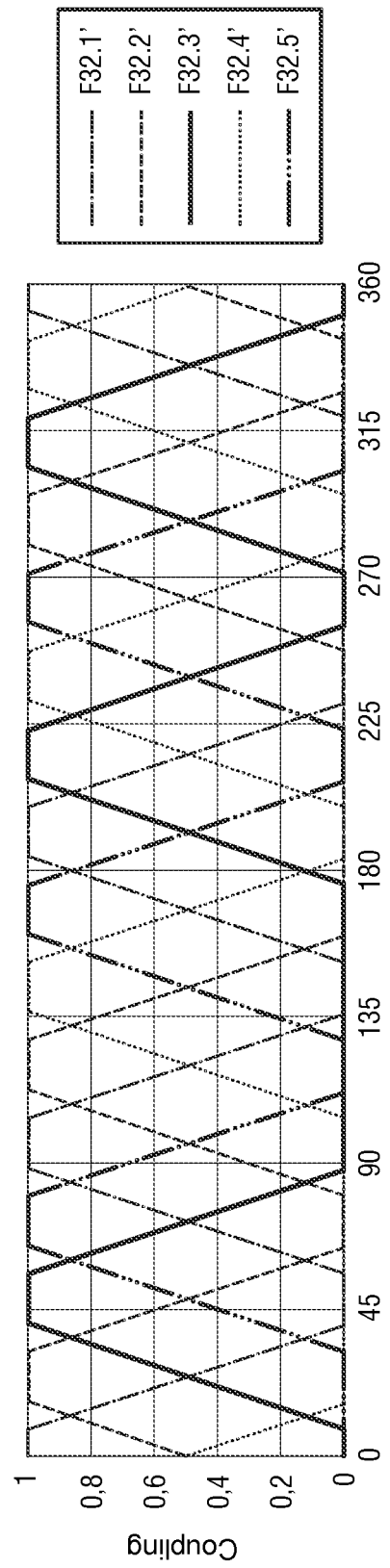
Fig. 5a
Fig. 5b

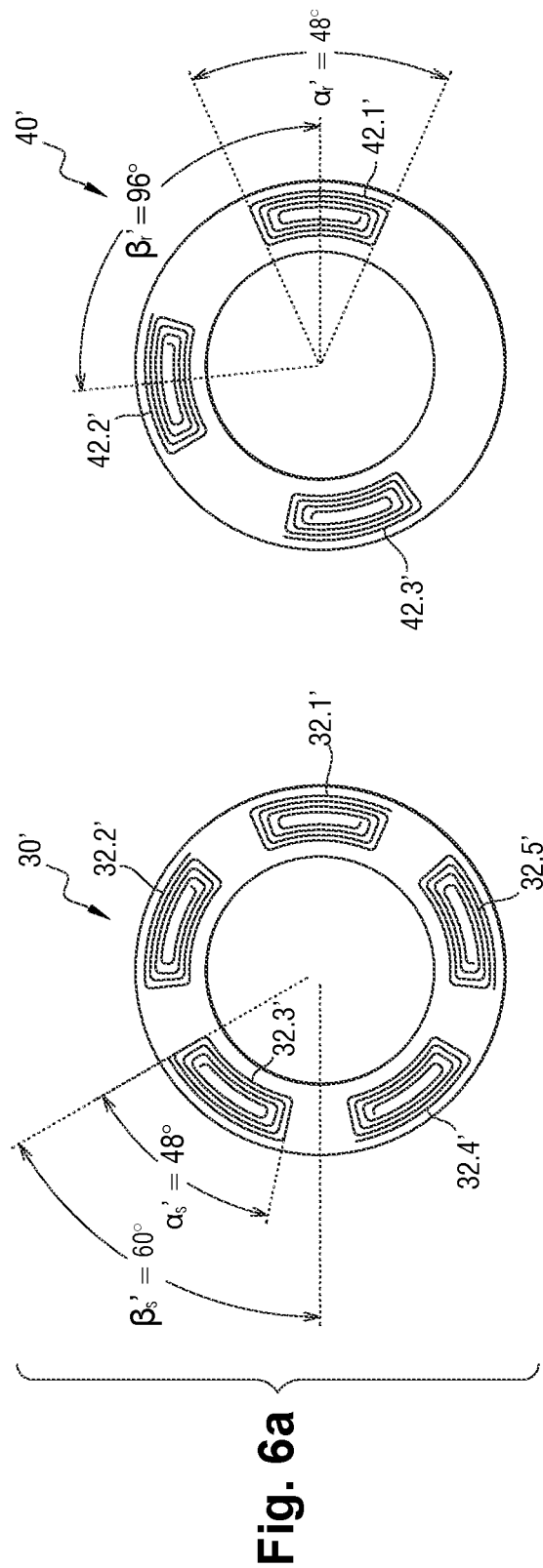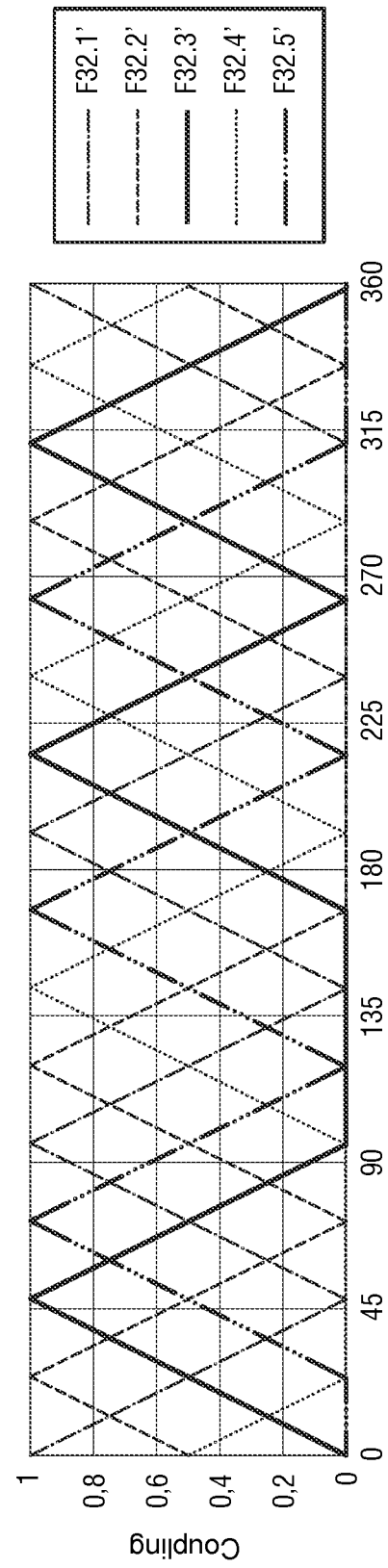
Fig. 6a
Fig. 6b

DEVICE FOR MEASURING AN ANGULAR POSITION OF A MOVABLE BODY RELATIVE TO A STATIONARY BODY

The present invention relates to a device for measuring an angular parameter, particularly, but not exclusively, of an aircraft wheel.

BACKGROUND OF THE INVENTION

A system for braking aircraft landing gear wheels conventionally makes use of an anti-lock function for the wheels that are said to be "braked", i.e. the wheels to which braking is applied. The anti-lock function seeks to detect when braked wheels begin to lock, and to regulate braking so as to avoid such locking.

In order to operate, the braking system includes calculation means and also, for each braked wheel, a respective tachometer arranged to transform the speed of rotation of the braked wheel into a signal that is transmitted to the calculation means.

A conventional tachometer for a braked aircraft wheel includes a passive sensor, e.g. such as a variable reluctance sensor. The passive sensor thus comprises a coil with terminals across which there is induced a voltage that is proportional to the speed of rotation of the wheel. By its very nature, such a tachometer is of limited accuracy at low speed and therefore cannot be used in reliable manner to calculate the distance travelled by the wheel.

In order to improve the sensitivity and the accuracy with which the speed of rotation of the wheel is measured, proposals have been made to devise a tachometer that makes use of electromagnetic coupling between first and second printed circuits that are mounted facing each other, one on the axle carrying wheel and the other on the wheel. The first printed circuit and the second printed circuit are circular in shape and they are centered on the axis of rotation of the wheel. The first printed circuit has a plurality of first coils that are angularly distributed in regular manner in the proximity of a circumference of said first circuit. The second circuit, which is driven in rotation by the wheel, has a second coil arranged in the proximity of a circumference of said second circuit so as to pass in front of each of the first coils during rotation of the wheel. The first coils can thus pick up a measurement signal that is representative of the angular position of the second coil, and thus on the wheel. The speed of rotation of the wheel is obtained by differentiating the measurement signal.

Nevertheless, it can be found that the accuracy of such a tachometer is limited in that, for certain angular positions of the second coil, the first coils cannot pick up any measurement signal, in particular when the second coil is in a position between two first coils. That type of tachometer thus cannot determine the speed of rotation of the wheel continuously, nor can it determine its direction of rotation, so it cannot perform any kind of odometer function.

OBJECT OF THE INVENTION

An object of the invention is thus to propose an angle measurement device that is reliable and that enables the above-mentioned drawbacks to be obviated, at least in part.

SUMMARY OF THE INVENTION

To this end, there is provided a measurement device for measuring the angular position of a movable body that is rotatable about an axis of rotation relative to a stationary body. The device comprises a stationary portion for securing to the stationary body and a movable portion for securing to the movable body. The stationary portion comprises a first printed circuit having first tracks formed thereon defining at least one transmit pattern and a plurality of measurement patterns that are angularly distributed in regular manner in the proximity of a circumference of the first printed circuit. The movable portion comprises a second printed circuit having second tracks formed thereon defining at least one receive pattern and a plurality of target patterns that are angularly distributed in regular manner in the proximity of a circumference of the second printed circuit. The first printed circuit and the second printed circuit are coupled together electromagnetically in such a manner that, when the transmit pattern is excited by an excitation signal, an induced signal is generated in the receive pattern and is then transmitted by the target patterns in order to generate, in the measurement patterns, a measurement signal that is representative of the positions of the target patterns and thus of the second printed circuit.

According to the invention, the target patterns are angularly distributed in irregular manner, the number of target patterns being not less than two, and the product of the number of target patterns multiplied by the number of measurement patterns being not less than twelve.

Such a number and such a distribution of the target patterns serves to limit or even to eliminate angular positions of the second circuit in which none of the measurement patterns picks up a measurement signal.

Furthermore, for a given angular position of the second circuit, a plurality of measurement signals can be picked up by the measurement patterns, thereby making it possible not only to increase the accuracy with which the angular position of the wheel is determined, but also to lift any ambiguity concerning its direction of rotation.

In particular manner, the number of target patterns is not less than three and the number of measurement patterns is not less than the number of target patterns plus two.

In particular manner, the ratio between the subtended angle of the target patterns and the subtended angle of the measurement patterns lies in the range 1 to 1.5.

Advantageously, the ratio between the subtended angle of the target patterns and the subtended angle of the measurement patterns is substantially equal to 1.

The measurement signals picked up by the measurement patterns are then triangular in shape and they do not include any level portions in which it is impossible to determine speed, but only singularities where the slope of the measurement signals is inverted.

In particular manner, the receive pattern and the transmit pattern present respective axes of revolution that coincide with the axis of rotation of the movable body.

In particular manner, the transmit pattern extends in the proximity of a circumference of the first printed circuit and the receive pattern extends in the proximity of a circumference of the second printed circuit.

In particular manner, at least one pattern from among the target patterns and the measurement patterns is a coil.

Advantageously, at least one pattern from among the receive pattern and the transmit pattern is a coil.

In particular manner, the measurement device is also arranged to measure a speed of the movable body.

In particular manner, the movable body is a vehicle wheel mounted on an axle to rotate about an axis of rotation, the stationary portion of the measurement device being for securing to the axle and the movable portion being for being driven in rotation by the wheel.

There is also provided a tachometer including such a measurement device.

There is also provided an odometer including such a measurement device.

The invention also provides aircraft landing gear including a wheel, such a tachometer, and/or such an odometer, the tachometer and the odometer being arranged respectively to measure the speed of rotation of the wheel and the distance travelled by the wheel when in motion.

BRIEF DESCRIPTION OF THE DRAWINGS

The invention can be better understood in the light of the following description, which is purely illustrative and non-limiting, and which should be read with reference to the accompanying drawings, in which:

FIG. 3A is a diagram showing a first configuration of the measurement patterns and of the target patterns arranged on the first and second printed circuits shown in FIG. 2;

FIG. 3B shows a graph plotting the measurement signals picked up by the measurement patterns shown in FIG. 3A;

FIG. 4A is a diagram showing a second configuration of the measurement patterns and of the target patterns arranged on the first and second printed circuits shown in FIG. 2;

FIG. 4B shows a graph plotting the measurement signals picked up by the measurement patterns shown in FIG. 4A;

FIG. 5A is a diagram showing a first configuration of measurement patterns and of target patterns arranged on the first and second printed circuits of a measurement device in a second embodiment of the invention;

FIG. 5B shows a graph plotting the measurement signals picked up by the measurement patterns shown in FIG. 5A;

FIG. 6A is a diagram showing a second configuration of the measurement patterns and of the target patterns arranged on the first and second printed circuits shown in FIG. 5A; and FIG. 6B shows a graph plotting the measurement signals picked up by the measurement patterns shown in FIG. 6A.

DETAILED DESCRIPTION OF THE INVENTION

Figure 1:
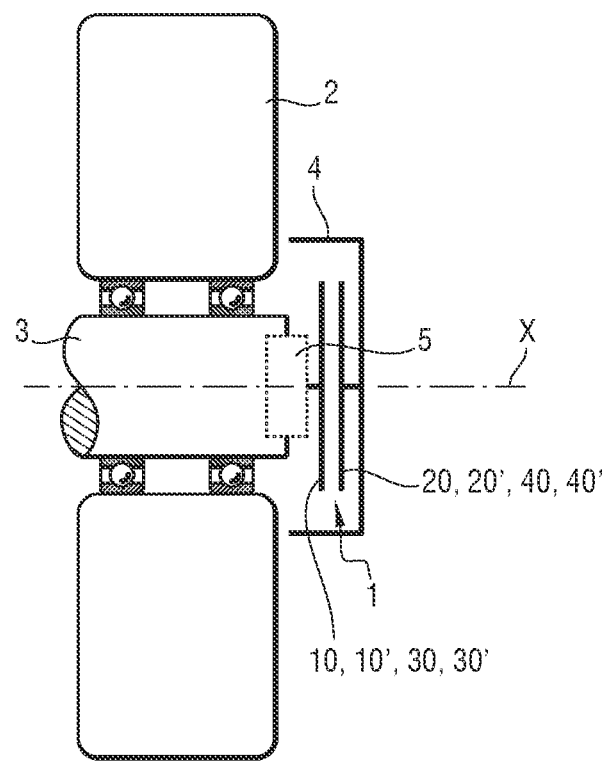
FIG. 1 is a diagrammatic elevation view of a braked wheel of aircraft landing gear provided with a measurement device in a first embodiment of the invention.

With reference to FIG. 1, a measurement device 1 in a first embodiment of the invention is incorporated in a tachometer of a braked wheel 2 of aircraft landing gear. The wheel 2 is mounted on an axle 3 of the landing gear in order to rotate about an axis of rotation X along which the axle 3 extends.

The measurement device 1 is for measuring the angular position and the speed of rotation of the wheel 2, and it comprises a stationary portion secured to the axle 3 and a movable portion driven in rotation by the wheel 2.

The stationary portion is positioned at one end of the axle 3. The movable portion is fastened to and incorporated in a wheel cover 4 that is constrained to rotate with the wheel 2. The wheel cover 4 is for protecting the end of the axle 3.

The stationary portion and the movable portion of the measurement device 1 comprise respectively a first printed circuit 10 and a second printed circuit 20, each of which is in the form of a disk and extends coaxially around the axis of rotation X of the wheel 2 in a respective plane perpendicular to said axis of rotation X. The first and second circuits 10 and 20 face each other and are spaced apart by a distance that typically lies in the range 0.5 millimeters (mm) to 10 mm. It should be observed that the term "printed circuit" is used herein to mean both the board carrying the printed circuit and the printed circuit itself.

Figure 2:
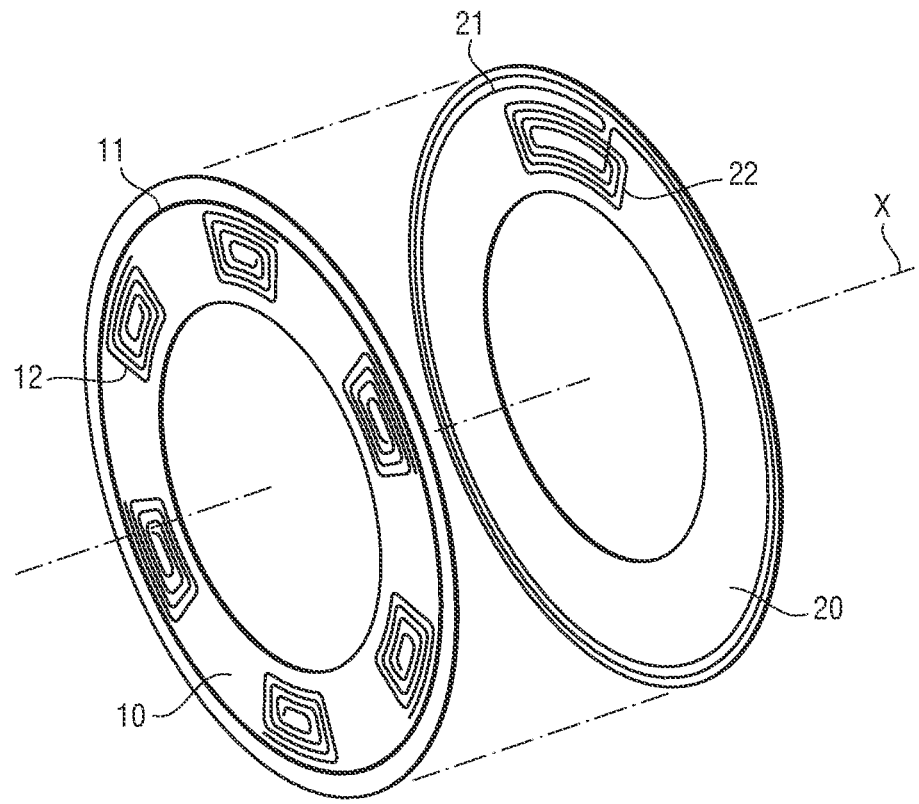
FIG. 2 is an isometric view of the first printed circuit and of the second printed circuit of the measurement device shown in FIG. 1.

With reference to FIGS. 2 and 3A, first copper tracks are formed on the first printed circuit 10. In this example, the first tracks are etched on the first circuit 10 and define one transmit pattern 11 and six measurement patterns 12. The measurement patterns 12 are substantially identical to one another and they are distinguished from one another in FIG. 3A by adding the digit 1, 2, 3, 4, 5, or 6 to the numerical reference 12.

The transmit pattern 11 extends in the proximity of the outer circumference of the first circuit 10, and the measurement circuits 12 are angularly distributed in regular manner in the proximity of the outer circumference of the first circuit 10. Two adjacent measurement patterns 12 are thus spaced apart by an angle $\beta_s$ that is equal to 60°. Each of the measurement patterns 12 is inscribed between two radii of the first circuit 10 and in this example, the measurement patterns 12 subtend an angle at the center $\alpha_s$ that is substantially equal to 40°, this subtended angle $\alpha_s$ corresponding to the angle between the two radii between which each measurement pattern 12 is inscribed.

The transmit pattern 11 presents an axis of revolution coinciding with the axis of rotation X of the wheel 2. In this example, the transmit pattern 11 is a coil presenting a plurality of turns formed by one of the first tracks of the first circuit 10. The diameters of the turns are close to the outside diameter of the first circuit 10.

In this example, each measurement pattern 12 is a coil presenting a plurality of turns formed by one of the first tracks of the first circuit 10.

The transmit pattern 11 and the measurement patterns 12 are connected to an electronic processor unit 5 secured to the end of the axle 3. The electronic processor unit 5 is connected to the braking system of the wheel 2.

Second copper tracks are formed on the second circuit 20. In this example, the second tracks are etched on the second circuit 20 and they define a receive pattern 21 and two target patterns 22. The target patterns 22 are substantially identical and they are distinguished from each other in FIG. 3A by adding the digit 1 or 2 to the numerical reference 22.

The receive pattern 21 extends in the proximity of the circumference of the second circuit 20 and the target patterns 22 are angularly distributed in irregular manner in the proximity of the circumference of the second circuit 20. In this example, the target patterns 22 are spaced apart by an angle Rr that is substantially equal to 150° and each of them subtends an angle at the center $\alpha_r$ that is substantially equal to 60°. The ratio r between the subtended angle $\alpha_r$ of the target patterns 22 and the subtended angle $\alpha_s$ of the measurement patterns 12 is thus substantially equal to 1.5.

The receive pattern 21 presents an axis of revolution coinciding with the axis of rotation X of the wheel 2. In this example, the receive pattern 21 is a coil presenting a plurality of turns formed by one of the second tracks of the second circuit 20. The diameters of the turns are close to the outside diameter of the second circuit 20.

In this example, the target pattern 22 is a coil presenting a plurality of turns formed by one of the second tracks of the second circuit 20.

The electronic processor unit 5 is arranged to generate an excitation signal that is transmitted to the transmit pattern 11. The excitation signal is a high-frequency alternating electrical signal.

The first circuit 10 and the second circuit 20 are coupled together electromagnetically in such a manner that when the transmit pattern 11 is excited by the excitation signal, an induced signal is generated in the receive pattern 21. Specifically, the electromagnetic coupling is inductive coupling.

The induced signal comprises a current I(t) flowing in the receive pattern 21 and in the target patterns 22 of the second circuit 20. Excitation of a target pattern 22 by the current I(t) produces a magnetic field B(t). It should be recalled that according to the Biot Savart law, the current I(t) produces a magnetic field B(t) from a point P at a point M in three-dimensional space, such that:

$$\vec{B(t)} = \frac{\mu_0}{4\pi} \int_P I(t) \cdot \vec{dl} \wedge \frac{\overrightarrow{PM}}{PM^3} = \frac{\mu_0}{4\pi} I(t) \int_P \vec{dl} \wedge \frac{\overrightarrow{PM}}{PM^3}$$

This magnetic field B(t) causes an electromotive force to appear in each coil of the measurement patterns 12 of the first circuit 10 (Lenz's law and Faraday's law). The electromotive force e appearing in each coil of the measurement patterns 12 is a function of the magnetic flux φ(t) passing through the coil:

$$e = -\frac{d\phi}{dt}$$

The magnetic flux φ(t) through the coil is defined by:

$$\phi(t) = \int\int_S \vec{B}(t) \cdot \vec{dS} = \frac{\mu_0}{4\pi} I(t) \cdot \int\int_S \int_P \left( \vec{dl} \wedge \frac{\overrightarrow{PM}}{PM^{3)}} \right) \cdot \vec{dS}$$

where $\vec{S}$ is the surface vector normal to the coil.

Assuming that the system is quasi-stationary, it is possible, for any particular measurement pattern 12, to calculate a set of k values corresponding to k different positions of the target patterns 22:

$$L_k = \frac{\mu_0}{4\pi} \cdot \int\int_S \int_P \left( \vec{dl} \wedge \frac{\overrightarrow{PM}}{PM^{3)}} \right) \cdot \vec{dS}$$

These $L_k$ terms represent the mutual inductance between the coils of the target patterns 22 and the coil of the measurement pattern 12 depending on the positions of the target patterns 22.

The resulting electromotive force is thus:

$$e(t) = -L_k \cdot \frac{dI(t)}{dt}.$$

where I(t) and e(t) are sinusoidal electrical magnitudes of frequency f=ω/2π. The electromotive force e measured on each coil of a measurement pattern 12 is thus:

$$e = -jL_k \cdot \omega I.$$

Thus, for a given value of current and at a given frequency, e is a function of the positions of the target patterns 22 relative to the measurement pattern 12.

The electronic processor unit 5 acquires measurement signals F12 associated with the set of measurement patterns 12. Each measurement signal F12 is an electromotive force.

As shown in FIG. 3B, the electromotive force measured for a given measurement pattern 12 depends on the angular positions of the target patterns 22 relative to said given measurement pattern 12, and thus on the angular position of the second circuit 20 relative to the first circuit 10.

The measurement signals F12 are distinguished in FIG. 3B by adding to the alphanumeric reference F12 the digit 1, 2, 3, 4, 5, or 6 corresponding to the number of the associated measurement pattern 12. Thus:

the measurement signal F12.1 corresponds to the electromotive force measured for the measurement pattern 12.1 positioned at 0°;

the measurement signal F12.2 corresponds to the electromotive force measured for the measurement pattern 12.2 positioned at 60°;

the measurement signal F12.3 corresponds to the electromotive force measured for the measurement pattern 12.3 positioned at 120°;

the measurement signal F12.4 corresponds to the electromotive force measured for the measurement pattern 12.4 positioned at 180°;

the measurement signal F12.5 corresponds to the electromotive force measured for the measurement pattern 12.5 positioned at 240°; and the measurement signal F12.6 corresponds to the electromotive force measured for the measurement pattern 12.6 positioned at 300°.

By way of example, it may be observed that the measurement signal F12.2:

is zero when the angular position of the second circuit 20 lies in the range 0° to 40°;

increases linearly when the angular position of the second circuit 20 is moving towards 80°, i.e. when the target pattern 22.2 is moving towards the measurement pattern 12.2;

is at a maximum when the angular position of the second circuit 20 lies in the range 80° to 100°, i.e. when the target pattern 22.2 is facing the measurement pattern 12.2;

decreases linearly when the angular position of the second circuit 20 is moving away from 100°, i.e. when the target pattern 22.2 is moving away from the measurement pattern 12.2;

is zero once again when the angular position of the second circuit 20 lies in the range 140° to 250°;

increases linearly once again when the angular position of the second circuit 20 is moving towards 290°, i.e. when the target pattern 22.1 is moving towards the measurement pattern 12.2;

is at a maximum once again when the angular position of the second circuit 20 lies in the range 290° to 310°, i.e. when the target pattern 22.1 is facing the measurement pattern 12.2; and decreases linearly once again when the angular position of the second circuit 20 is moving away from 310°, i.e. when the target pattern 22.1 is moving away from the measurement pattern 12.2.

In more general manner, the measurement signals F12 comprise a succession of first portions for which the electromotive force varies linearly, and of second portions for which the electromotive force is constant and thus unusable for determining the angular position of the second circuit 20.

As can be seen in FIG. 3B, the measurement signals F12 of the various measurement patterns 12 are interleaved in such a manner that for any given angular position of the second circuit 20, two to four of the six measurement signals F12 have a nonzero slope. This interleaving enables the electronic processor unit 5 to act continuously not only to determine the angular position of the second circuit 20 relative to the first circuit 10, but also to determine the direction of rotation of said second circuit 20. It is thus possible to associate the measurement device 1 with an odometer function in order to measure the distance travelled by the wheel 2.

FIG. 4A shows a first printed circuit 10' and a second printed circuit 20' comprising variants of the first printed circuit 10 and of the second printed circuit 20 of the measurement device 1.

In similar manner to the first circuit 10, the first circuit 10' includes six measurement patterns 12' angularly distributed in regular manner in the proximity of the circumference of the first circuit 10'. Two adjacent measurement patterns 12' are thus spaced apart by an angle $\beta_s'$ that is equal to 60°. The measurement patterns 12' are substantially identical and they are distinguished from one another in FIG. 4A by adding the digit 1, 2, 3, 4, 5, or 6 to the numerical reference 12'.

The first circuit 10' differs from the first circuit in that the measurement patterns 12' subtend an angle at the center $\alpha_s'$ that is substantially equal to 60° and not to 40°.

The second circuit 20' is identical to the second circuit 20. In similar manner to the second circuit 20, the second circuit 20' thus includes two target patterns 22' that are substantially identical and that extend in the proximity of the circumference of the second circuit 20'. The target patterns 22' are spaced apart by an angle $\beta_r'$ that is substantially equal to 150° and each of them subtends an angle at the center $\alpha_r'$ that is substantially equal to 60°. The target patterns 22' are distinguished in FIG. 4A by adding the digit 1 or 2 to the numerical reference 22'.

The ratio r between the subtended angle $\alpha_r'$ of the target patterns 22' and the subtended angle $\alpha_s'$ of the measurement patterns 12' is thus substantially equal to 1.

As above, the electromotive force measured for a given measurement pattern 12' depends on the angular positions of the target patterns 22', and thus on the angular position of the second circuit 20' relative to said given measurement circuit 12'. The measurement signals F12' associated with the measurement patterns 12' are distinguished in FIG. 4B by adding the corresponding digit 1, 2, 3, 4, 5 or 6 to the reference F12'.

It may be observed that the measurement signal F12.2':
is zero when the angular position of the second circuit 20' lies in the range 0° to 30°;
increases linearly when the angular position of the second circuit 20' is moving towards 90°, i.e. when the target pattern 22.2' is moving towards the measurement pattern 12.2';
reaches a maximum when the angular position of the second circuit 20' is equal to 90°, i.e. when the target pattern 22.2' is facing the measurement pattern 12.2';
decreases linearly when the angular position of the second circuit 20' is moving away from 90°, i.e. when the target pattern 22.2' is moving away from the measurement pattern 12.2';
is zero once again when the angular position of the second circuit 20' lies in the range 150° to 240°;
increases linearly once again when the angular position of the second circuit 20' is moving towards 300°, i.e. when the target pattern 22.1' is moving towards the measurement pattern 12.2';
reaches a maximum once again when the angular position of the second circuit 20' is equal to 300°, i.e. when the target pattern 22.1' is facing the measurement pattern 12.2'; and
decreases linearly once again when the angular position of the second circuit 20' is moving away from 300°, i.e. when the target pattern 22.1' is moving away from the measurement pattern 12.2'.

In more general manner, the measurement signals F12.2' comprise a succession of first portions for which the electromotive force varies linearly in increasing and then decreasing manner, and of second portions for which the electromotive force is zero and thus unusable for determining the angular position of the second circuit 20'.

As above, the measurement signals F12' of the various measurement patterns 12' are interleaved in such a manner that for any given angular position of the second circuit 20', two to four of the six measurement signals F12' have a nonzero slope. This interleaving enables the electronic processor unit 5 not only to determine accurately the angular position of the second circuit 20' relative to the first circuit 10', but also to determine the direction of rotation of said second circuit 20'. It is thus possible to associate the measurement device 1 with an odometer function in order to measure the distance travelled by the wheel 2.

By comparing the FIGS. 3B and 4B, it can be observed that unlike the measurement signals F12, the measurement signals F12' reach a maximum only momentarily. The angular position of the wheel 2 can thus be determined more accurately with the first and second circuits 10' and 20' than with the first and second circuits 10 and 20. Advantageously, it is thus preferable for the ratio r between the subtended angles of the target patterns and of the measurement patterns to be substantially equal to 1.

FIG. 5A shows a first printed circuit 30 and a second printed circuit 40 of a measurement device in a second embodiment of the invention.

The first circuit 30 differs from the first circuits 10 and 10' in that it has five measurement patterns 32 instead of six. The measurement patterns 32 are angularly distributed in regular manner in the proximity of the circumference of the first circuit 30. Two adjacent measurement patterns 32 are thus spaced apart by an angle $\beta_s$ that is equal to 72°. The measurement patterns 32 are substantially identical and they are distinguished from one another in FIG. 5A by adding the digit 1, 2, 3, 4, or 5 to the numerical reference 32.

The measurement patterns 32 subtend an angle at the center $\alpha_s$ that is substantially equal to 32°.

The second circuit 40 differs from the second circuits 20 and 20' in that it has three target patterns 42 instead of two. The target patterns 42 are substantially identical and they extend in the proximity of the circumference of the second circuit 40. The target patterns 42 are spaced apart by an angle $\beta_s$ that is substantially equal to 96° and each of them subtends an angle at the center $\alpha_r$ that is substantially equal to 48°. The target patterns 42 are distinguished in FIG. 5A by adding the digit 1, 2, or 3 to the numerical reference 42.

The ratio r between the subtended angle $\alpha_r$ of the target patterns 42 and the subtended angle $\alpha_s$ of the measurement patterns 32 is thus substantially equal to 1.5.

As above, the electromotive force measured for a given measurement pattern 32 depends on the angular positions of the target patterns 42, and thus on the angular position of the second circuit 40 relative to said given measurement circuit 32. The measurement signals F32 are distinguished in FIG. 5B by adding to the numerical reference F32 the digit 1, 2, 3, 4, or 5 corresponding to the number of the associated measurement pattern 32.

The measurement signals F32 are similar in form to the measurement signals F12 in that they comprise a succession of first portions for which the electromotive force varies linearly, and of second portions for which the electromotive force is constant and thus unusable for determining the angular position of the second circuit 40.

The measurement signals F32 of the various measurement patterns 12 are interleaved in such a manner that for any given angular position of the second circuit 40, two to four of the five measurement signals F32 have a nonzero slope. This interleaving enables the electronic processor unit 5 to act continuously not only to determine the angular position of the second circuit 40 relative to the first circuit 30, but also to determine the direction of rotation of said second circuit 40. It is thus possible to associate the measurement device with an odometer function in order to measure the distance travelled by the wheel 2.

FIG. 6A shows a first printed circuit 30' and a second printed circuit 40' comprising variants of the first printed circuit 30 and of the second printed circuit 40.

In similar manner to the first circuit 30, the first circuit 30' includes five measurement patterns 32' angularly distributed in regular manner in the proximity of the circumference of the first circuit 30'. Two adjacent measurement patterns 32' are thus spaced apart by an angle $\beta_s'$ that is equal to 72°. The measurement patterns 32' are substantially identical and they are distinguished from one another in FIG. 6A by adding the digit 1, 2, 3, 4, or 5 to the numerical reference 32'.

The first circuit 30' differs from the first circuit in that the measurement patterns 32' subtend an angle at the center $\alpha_s'$ that is substantially equal to 48° instead of 32°.

The second circuit 40' is identical to the second circuit 40. In similar manner to the second circuit 40, the second circuit 40' thus includes three target patterns 42' that are substantially identical and that extend in the proximity of the circumference of the second circuit 40'. The target patterns 42' are spaced apart by an angle $\beta_r'$ that is substantially equal to 96° and each of them subtends an angle at the center $\alpha_r'$ that is substantially equal to 48°. The target patterns 42' are distinguished in FIG. 6A by adding the digit 1, 2, or 3 to the numerical reference 42'.

The ratio r between the subtended angle $\alpha_r'$ of the target patterns 42' and the subtended angle $\alpha_s'$ of the measurement patterns 32' is thus substantially equal to 1.

As above, the electromotive force measured for a given measurement pattern 12' depends on the angular positions of the target patterns 42', and thus on the angular position of the second circuit 40' relative to said given measurement circuit 32'. The measured measurement signals F42' are distinguished in FIG. 6B by adding to the alphanumeric reference F32' the digit 1, 2, 3, 4, or 5 corresponding to the number of the associated measurement pattern 32'.

The measurement signals F42' are similar in form to the measurement signals F12' in that they comprise a succession of first portions for which the electromotive force varies linearly, and of second portions for which the electromotive force is zero and thus unusable for determining the angular position of the second circuit 40'.

The measurement signals F32' of the various measurement patterns 32' are interleaved in such a manner that for any given angular position of the second circuit 40', two to four of the five measurement signals F32' have a nonzero slope. This interleaving enables the electronic processor unit 5 to act continuously not only to determine the angular position of the second circuit 40' relative to the first circuit 30', but also to determine the direction of rotation of said second circuit 40'. It is thus possible, as above, to associate the measurement device 1 with an odometer function in order to measure the distance travelled by the wheel 2.

Comparing FIGS. 5B and 6B merely confirms the observation made when comparing FIGS. 3B and 4B: in most applications, it is preferable for the ratio r between the subtended angles of the target patterns and of the measurement patterns to be substantially equal to 1.

In general manner, the ratio of the measurement signal divided by the measurement signal noise is proportional to the ratio of the number of measurement patterns divided by $\sqrt{r}$. The optimum configuration for the first and second circuits is thus obtained for:
 a ratio r of the subtended angles that is substantially equal to 1;
 three target patterns; and
 the maximum number of measurement patterns that can be included in the first circuit.

In practice, there is a first order limitation that depends on the number of measurement signals that are simultaneously available and on the increase in losses resulting from reducing the sizes of the measurement patterns and of the target patterns. A number of measurement patterns lying in the range six to eight appears to provide a good compromise.

Naturally, the invention is not limited to the embodiments described, but covers any variant coming within the ambit of the invention as defined by the claims.

The above-described measurement devices are used for measuring the angular position and the speed of rotation of a braked wheel of aircraft landing gear. The measurement devices could naturally be used for measuring the angular position and/or the speed of rotation of a wheel of some other type of vehicle, and indeed of any type of body rotating relative to a stationary body in any type of application and technical field.

More generally, the measurement devices could be used for measuring any type of position, movement, or speed of any body that moves relative to a stationary body. The measurement devices are that is perfectly suitable for use in measuring a linear position and/or speed.

The number, the positions, and the shapes of the patterns may differ from those described above. In particular, it should be observed that the patterns are not necessarily coils, but could be plane antennas of various shapes, for example. Under such circumstances, the coupling between the first printed circuit and the second printed circuit could be capacitive coupling and not inductive coupling. The frequency of the excitation signal is naturally adapted to the patterns being used.

The invention claimed is:

1. A measurement device for measuring the angular position of a movable body that is rotatable about an axis of rotation relative to a stationary body, the measurement device comprising:
 a stationary portion for securing to the stationary body, the stationary portion comprising:
  a first printed circuit having first tracks formed thereon defining at least one transmit pattern; and
  a plurality of measurement patterns that are angularly distributed in regular manner in the proximity of a circumference of the first printed circuit; and
 a movable portion for securing to the movable body, the movable portion comprising:

a second printed circuit having second tracks formed thereon defining at least one receive pattern; and a plurality of target patterns in the proximity of a circumference of the second printed circuit wherein the first printed circuit and the second printed circuit are electromagnetically coupled in such a manner that, when the transmit pattern is excited by an excitation signal, an induced signal is generated in the receive pattern and is then transmitted by the target patterns in order to generate, in the measurement patterns, a measurement signal that is representative of the positions of the target patterns and thus of the second printed circuit, and wherein the target patterns are angularly distributed in irregular manner, the number of target patterns is not less than two, and the product of the number of target patterns multiplied by the number of measurement patterns is not less than twelve.

2. The measurement device according to claim 1, wherein the number of target patterns is not less than three and the number of measurement patterns is not less than the number of target patterns plus two.

3. The measurement device according to claim 1, wherein the ratio between the subtended angle of the target patterns and the subtended angle of the measurement patterns lies in the range 1 to 1.5.

4. The measurement device of claim 3, wherein the ratio between the subtended angle of the target patterns and the subtended angle of the measurement patterns is substantially equal to 1.

5. The measurement device according to claim 1, wherein the receive pattern and the transmit pattern present respective axes of revolution that coincide with the axis of rotation of the movable body.

6. The measurement device according to claim 5, wherein at least one pattern from among the receive pattern and the transmit pattern is a coil.

7. The measurement device according to claim 1, wherein the transmit pattern extends in the proximity of a circumference of the first printed circuit and the receive pattern extends in the proximity of a circumference of the second printed circuit.

8. The measurement device according to claim 1, wherein at least one pattern from among the target patterns and the measurement patterns is a coil.

9. The measurement device according to claim 1, also arranged to measure a speed of the movable body.

10. The measurement device according to claim 1, wherein the movable body is a vehicle wheel mounted on an axle to rotate about an axis of rotation, the stationary portion being for securing to the axle and the movable portion being for being driven in rotation by the wheel.

11. A tachometer including a measurement device according to claim 10.

12. An odometer including a measurement device according to claim 10.

13. Aircraft landing gear including a wheel, a tachometer, and/or an odometer, wherein the tachometer and/or odometer includes a measurement device according to claim 10, the tachometer and the odometer being arranged respectively to measure the speed of rotation of the wheel and the distance travelled by the wheel when in motion.

* * * * *